United States Patent Office 3,459,759
Patented Aug. 5, 1969

3,459,759
CERTAIN SUBSTITUTED IMIDAZO-
[4,5-b OR c]PYRIDINES
Hans F. W. Röchling, Karl-Heinz Büchel, and Friedrich
W. A. G. K. Korte, Hangelar, Germany, assignors to
Shell Oil Company, New York, N.Y., a corporation of
Delaware
No Drawing. Filed Nov. 9, 1966, Ser. No. 592,982
Claims priority, application Germany, Nov. 24, 1965,
S 100,642
Int. Cl. C07d 57/04, 49/36; A01n 9/22
U.S. Cl. 260—296                                   3 Claims This invention relates to novel compounds useful in destroying and/or preventing growth of unwanted plants.

The novel compounds of the invention are imidazopyridines and N-oxides thereof, described by the formulae:

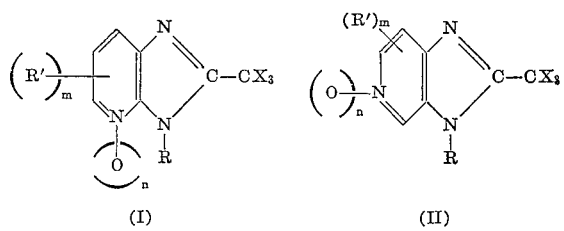

wherein R is hydrogen or a functional group that readily hydrolyzes to substitute the indicated nitrogen atom with hydrogen, R' is halogen, nitro, trifluoromethyl, methylthio, methylsulfinyl or methylsulfonyl, X is halogen, $n$ is zero or one, $m$ is 1, 2 or 3.

The functional group represented by R is preferably carboalkoxy of from 2 to 5 carbon atoms.

Of this genus of compounds, one class appears to exhibit the highest level of herbicidal activity. This class is that defined in Formula I, above, wherein X is fluorine, $n$ is zero, R is hydrogen and R' is middle halogen—bromine or chlorine—particularly chlorine and $m$ is 1 or 2.

Typical species of these compounds, illustrating the genus, are set out in the examples presented hereinafter showing preparation and herbicidal screening of those species.

The imidazopyridines of the invention can be prepared by processes known in the art, such as those summarized in Weissberger, "The Chemistry of Heterocyclic Compounds, Imidazoles," vol. I, pp. 258–273. The 2-trifluoromethyl imidazopyridines are conveniently prepared by reacting the appropriate o-diaminopyridine with trifluoroacetic acid at a temperature of from about 60° C. to about 100° C. and cyclizing the resulting intermediate at a temperature of from about 200° C. to about 300° C., preferably in the presence of a powdered metal such as magnesium or aluminum. The N-oxides also can be prepared by known processes, such as treating the imidazopyridine with hydrogen peroxide in an acid medium, for example, glacial acetic acid, at temperatures of the order of 20 to 100° C.

The manner in which these imidazopyridines can be prepared is illustrated in the following examples, in which "parts" means parts by weight unless otherwise expressly indicated, and parts by weight bear the same relationship to parts by volume as does the kilogram to the liter.

EXAMPLE I 6.4 parts of 5-chloro-2,3-diaminopyridine was dissolved in 40 parts by volume of trifluoroacetic acid and the solution was boiled under reflux for 3 hours. Excess trifluoroacetic acid was distilled off, the residue was thoroughly mixed with 0.25 part of magnesium powder and the resulting mixture was heated at 310–315° C. for 100 minutes. Recrystallization of the product from ethanol yielded 7.4 parts (75% of the theoretical amount) of 2-trifluoromethyl - 6 - chloro-3H-imidazo[4,5-b]pyridine, melting point: 293° C.

Analysis (weight percent).—$C_7H_3N_3F_3Cl$ requires: C, 37.9; H, 1.4; N, 18.9; Cl, 16.1. Found: C, 38.0; H, 1.8; N, 18.9; Cl, 16.0.

EXAMPLE II

In a manner similar to that described in Example I, there was prepared the corresponding 6-bromo compound, melting point: 296–297.5° C.

Analysis (weight percent).—$C_7H_3N_3F_3Br$ requires: C, 31.7; H, 1.1; N, 15.8. Found: C, 31.3; H, 1.4; N, 16.0.

EXAMPLE III 11.5 parts of the imidazopyridine prepared according to Example I was dissolved in 21 parts by volume of absolute acetone and, with stirring, 3.64 parts of 97% sodium ethylate was added, the mixture being maintained at 40° C. and stirred for 2 hours. 5.4 parts of chloroformic acid ethyl ester was then added dropwise and the whole mixture warmed to 55° C. and held at that temperature for 28 hours. The precipitate was filtered off, the filtrate concentrated by evaporation of the solvent and the residue first reprecipitated from ether at −70° C. and then recrystallized from n-hexane. Yield: 3.4 parts (22% of the theoretical amount) 1-carbethoxy-5-chloro-2-trifluoromethyl-1H-imidazo[4,5-b]pyridine, melting point: 124–125° C.

Analysis (weight percent).—$C_{10}H_7N_3O_2F_3Cl$ requires: C, 40.9; H, 2.4; N, 14.3; Cl, 12.1. Found: C, 40.6; H, 2.6; N, 14.0; Cl, 11.7.

EXAMPLE IV 5.0 parts of 2-trifluoromethyl-6-chloro-3H-imidazo-[4,5-b]pyridine was dissolved in 200 parts by volume of glacial acetic acid at 70°–80° C., was mixed with 90 parts by volume of 3% hydrogen peroxide and stirred at 75° C. for 3 hours. Subsequently 15.6 parts by volume of 30% hydrogen peroxide were added and the mixture was stirred at 75° C. for a further 5 hours. The solution was then concentrated to half its original volume by evaporation of the solvent in vacuo, mixed with 100 parts by volume of water and the mixture was concentrated to 50 parts by volume by evaporation of the solvent. A white precipitate was formed. The suspension was neutralized with solid sodium carbonate. The combined precipitate was subsequently filtered off and recrystallized from ethanol. Melting point of product: 289–290° C. Yield: 3.1 parts (57.7% of the theoretical amount) of 2-trifluoromethyl - 6 - chloro-3H-imidazo[4,5-b]pyridine-4-N-oxide.

Analysis (weight percent).—$C_7H_3N_3OClF_3$ requires: C, 35.4; H, 1.3; N, 17.7; Cl, 14.9. Found: C, 35.5; H, 1.4; N, 17.6; Cl, 14.6.

EXAMPLE V 4 parts of 2-trifluoromethyl-6-chloro-3H-imidazo[4,5-b]pyridine-4-N-oxide and 3.8 parts of phosphorus pentachloride were suspended in 200 parts by volume of carbon tetrachloride and 5.6 parts of phosphorus oxychloride were added with stirring. The mixture was subsequently boiled under reflux for one hour, the N-oxide going into solution. On cooling a white substance was obtained which was recrystallized from ligroin at 100°/140° C. Melting point: 176°–178° C. Yield: 1.7 parts (42%).

According to nuclear resonance analysis the substance in question was a mixture of compounds chlorinated in the 5- and 7-position: 5,6(6,7)-dichloro-2-trifluoromethyl-3H-imidazo[4,5-b]pyridine.

Analysis (weight percent).—$C_7H_2N_3Cl_2F_3$ requires: C, 32.8; H, 0.8; N, 16.4; Cl, 27.8. Found: C, 33.8; H, 0.9; N, 16.7; Cl, 25.1.

The herbicidal activity of the compounds of the invention is demonstrated by the following tests.

EXAMPLE VI

(A) Soil mix test

Containers were filled with moist, sterile soil mixed with the test compound in amounts corresponding to 1 and 10 lb./acre and then placed on the surface of the moist soil. Small, approximately equal amounts of seed of the test plants were placed on the chemically impregnated soil in each container. The seed was subsequently covered with moist sterile soil and then watered. The containers were kept in a greenhouse for 14 days under identical conditions. The effect of the imidazoles was determined by visual observation of any plants found to be growing. Each test series also included a control test, in which no test compound was used.

Seeds of the following plants were used for carrying out the test series: Cress (Lepidium sativum), a broad-leaved plant, and cockspur grass (Echinochloa), a narrow-leaved plant.

(B) Spray test

The effect of imidazopyridines according to the invention sprayed on the surface of growing plants was determined. A mixture containing 2.5% by weight of the substance to be tested in 20 cubic centimeters of water and 1% by weight of "Tween 20" as surface-active agent, was sprayed on the test plants in amounts corresponding to 1 and 10 pounds of the imidazopyridine per acre.

Test plants were: foxtail (Amaranthus retroflexus) and hairy crabgrass (Digitaria sanguinalis). The plants were held in a greenhouse; the results of the spray test were determined by visual inspection of the plants two weeks after spraying.

The results of these tests are summarized in Table I. In this table the plant-growth inhibiting effect was evaluated on a scale of from 0 to 9, 0 signifying no effect and 9 complete kill of the plants.

TABLE I

| | | | Soil test | | | | Spray test | | | |
|---|---|---|---|---|---|---|---|---|---|---|
| | | | Lepidium, lb./acre | | Echinochloa, lb./acre | | Amaranthus, lb./acre | | Digitaria, lb./acre | |
| R | R'' | Further substituents | 1 | 10 | 1 | 10 | 1 | 10 | 1 | 10 |
| —CF$_3$ | H | 6-Br | 9 | 9 | 8 | 9 | 9 | 9 | 8 | 9 |
| —CF$_3$ | H | 6-Cl | 9 | 9 | 8 | 9 | 9 | 9 | 9 | 9 |
| —CF$_3$ | H | 6-Cl, N-oxide | 9 | 9 | 6 | 9 | 7 | 9 | 6 | 9 |
| —CF$_3$ | COOC$_2$H$_5$ | 6-Cl | 8 | 9 | 7 | 9 | 9 | 9 | 6 | 9 |
| —CF$_3$ | H | 6(5 or 7)-di-Cl | 9 | 9 | 9 | 9 | 9 | 9 | 9 | 9 |

EXAMPLE VII

In a further series of tests, 6-chloro-2-trifluoromethyl-3H-imidazo[4,5-b]pyridine (CTIP) was further tested. It was dissolved in various concentrations in a mixture containing 40% by volume of acetone, 60% by volume of water and 0.5% by weight per volume of Triton X-155 (a condensate of octyl phenol with ethylene oxide).

In one series of tests the solution was sprayed on the leaves of seedlings in an amount corresponding to about 60 gallons/acre. In further tests sterile compost in which seedlings were growing was impregnated with the test solution in a quantity corresponding to 1180 gallons/acre. Control tests were carried out with the solution in the absence of the active component. The phytotoxic effect of the active component was assessed by determining the reduction in fresh weight of stem and leaf of the test plants as compared with the control plants. The quantities of active component in pounds/acre, required to give a 50% or 90% reduction in the fresh weight after 14 days are given in Table II.

TABLE II

| Substance | Reduction in the fresh weight, percent | M | O | RG | P | F | Mu | S |
|---|---|---|---|---|---|---|---|---|
| Foliar spray (seedlings): | | | | | | | | |
| CTIP | 50 | 9.0 | 0.7 | <0.45 | 2.7 | <0.45 | <0.45 | <0.45 |
| CTIP | 90 | >14 | >14 | 0.45 | >14 | <0.45 | <0.45 | <0.45 |
| Compost spray (seedlings): | | | | | | | | |
| CTIP | 50 | >24 | 1.5 | <1.1 | | <1.1 | <1.1 | <1.1 |
| CTIP | 90 | | 14 | 7.0 | 2.2 | <1.1 | 1.7 | 3.3 |

O=Oats (Avena sativa)
RG=Rye grass (Lolium perenne)
M=Maize (Zea mays)
P=Peas (Pisum sativa)
S=Sugar beet (Beta vulgaris)
F=Flax (Linum usitatissum)
Mu=Mustard (Sinapis alba)

From the above it is clear that in post-emergence application CTIP is not very toxic to maize, peas and oats. The weed control dose required in each case can easily be derived from the results of the tests. In pea cultivation, for example, a post germination treatment with as little as 0.5–1 pounds per acre will provide a substantial freedom from weeds.

EXAMPLE VIII

Further tests demonstrated that the imidazopyridines are highly active when used in pre-emergence applications. In these tests, seeded soil was sprayed with an aqueous formulation of the test compound, different dosages of the test compound being applied in different tests. After 21 days, the results were tested and from dosage/effect curves the LD$_{95}$ dosage (dosage required for 95% kill of the test plants) was ascertained. The test plants used were: Italian rye-grass (Lolium multiflorum), brome (Bromus tectorum), hairy crabgrass (Digitaria sanguinalis), curly dock (Rumex tectorum), pigweed (Amaranthus sp.) and wild mustard (Brassica arvensis). The LD$_{95}$ dosages for each test compound with respect to each plant species are summarized in Table III.

TABLE III

| | LD$_{95}$ in pounds/acre | | | | | |
|---|---|---|---|---|---|---|
| | Lolium | Bromus | Digitaria | Rumex | Amaranthus | Brassica |
| 6,7-di-Cl | 1.2 | 1.0 | 1.0 | 0.4 | 0.6 | 0.3 |
| 6-Cl | <1.0 | <1.0 | 1.9 | <1.0 | <1.0 | <1.0 |
| 6-Br | 1.9 | 1.5 | 4.0 | <1.0 | 1.3 | <1.0 |
| 6-Cl, N-oxide | 1.3 | <1.0 | 10 | <1.0 | 1.5 | <1.0 |
| 6-Cl-3-CO$_2$C$_2$H$_5$ | 1.0 | 1.1 | 2.5 | <1.0 | 1.4 | <1.0 |

The imidazopyridines of the invention can themselves be used as a herbicide, or they can be used in the form of their salts, such as the potassium or sodium salts, or their amine salts.

The imidazopyridines of the invention are not very volatile, and tend to remain in that part of the soil into which they are introduced; some may be moved somewhat through the soil by water. Consequently, by appropriate selection of the dosage, the part of the soil into which they are introduced, relative to the seeds of wanted plants and those of unwanted plants, and taking into account the effect of water, these herbicides can be used to prevent all plant growth, even at relatively low dosages in some cases, or their selectivity can be improved to prevent growth of unwanted plants without harm to wanted plants. For example, as is well known, only those weed seeds which are present within about one-quarter inch of the surface of the soil will germinate, whereas the seeds of cereal, and other, crops, for example, ordinarily are sown about one-half to three-quarters of an inch below the surface of the soil, and germinate well under these conditions. By introducing the herbicide only into the top one-quarter inch of the soil, and avoiding excessive watering, germination of the weed seeds can be prevented, while germination of the crop seeds will not be effected. Thus, even those herbicides of this invention that are not very selective in their action can be used to selectively remove weeds from cereal grains or other crops. Of course, if complete kill of all plants in a given portion of soil is desired, it is necessary only to introduce one or more of the imidazopyridines throughout that portion of soil.

The imidazopyridines are soluble in the common organic horticultural solvents. Thus, according to the intended method of application, the character of the plants involved, and the concentration of herbicide to be used, the imidazopyridine can be formulated as a solution or suspension in water, or a suitable nonphytotoxic organic solvent, as a dispersion or emulsion of the active agent in a non-solvent therefor, as an emulsion of a solution of the active agent in a suitable solvent emulsified with a second, in homogeneous liquid, or as a solid comprising the active agent or agents sorbed on a sorptive solid carrier.

When a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, animal or vegetable oils as well as synthetic solvents also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such to the plants or to the soil that is to be treated, or they may be suspended in water and the suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agents as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example, Triton X–100 and Lissapol N—believed to be condensation products of alkylphenols with ethylene oxide—and Tweens—believed to be condensation products of ethylene oxide and higher fatty acid esters, for example, oleic acid ester of anhydrosorbitols.

Liquid compositions of these imidazopyridines suitable for application to plants or to their environment contain the active agent or agents in concentrations generally within the range of from about 0.01% by weight to about 50% by weight.

The invention includes novel solid compositions of matter wherein the active agent or agents are absorbed or adsorbed in or on a sorptive carrier, such as finely divided clay, talc, gypsum, lime, wood flour, fuller's earth, kieselguhr, or the like. The solid composition, or dust, may contain from as little as 1% by weight of active material to 75% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.1 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art. In general, a dosage of from about 0.2 to 10 pounds per acre will be most effective.

The herbicidal compositions may contain one or more of the imidazopyridines as the sole active agent, or they may contain in addition thereto other biologically active substances. Thus, insecticides, e.g., DDT, Endrin, dieldrin, aldrin, Chlordane, demeton, methoxychlor, DDVP, naled, Ciodrin® insecticide and Bidrin® insecticide, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners, other plant regulators, such as naphthalene acetic acid, 2,4-dichlorophenoxyacetic acid and the like, and/or herbicides of different properties.

We claim as our invention:

1. A member selected from the group consisting of an imidazopyridine having one of the formulae:

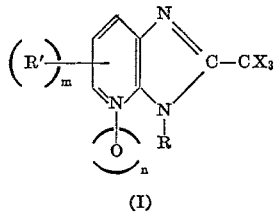 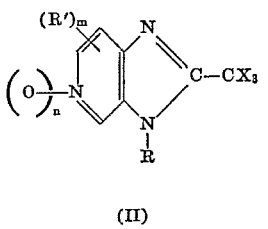

(I)          (II)

wherein R is hydrogen or carboalkoxy having 2–5 carbon atoms, nitro, trifluoromethyl, methylthio, methylsulfinyl or methylsulfonyl, X is halogen, $n$ is zero or one, $m$ is 1 or 2.

2. An imidazopyridine according to Formula I of claim 1 wherein X is fluorine, $n$ is zero, R is hydrogen, R' is halogen and $m$ is 1 or 2.

3. An imidazopyridine according to claim 2 wherein $m$ is 1 and R' is chlorine bonded at the 6-position.

References Cited

UNITED STATES PATENTS 3,401,030    9/1968    Berthold et al. _____ 71—69

HENRY R. JILES, Primary Examiner

ALAN L. ROTMAN, Assistant Examiner

U.S. Cl. X.R.

71—94; 260—294, 295

PO-1050
(5/69)

UNITED STATES PATENT OFFICE
CERTIFICATE OF CORRECTION

Patent No. 3,459,759          Dated    August 5, 1969

Inventor(s) Hans F.W. Rochling, Karl Heinz Buchel, and Friedrich W.A.G.K. Ko

It is certified that error appears in the above-identified patent and that said Letters Patent are hereby corrected as shown below:

In the claims, column 7, line 19, (being the second line of text following the formula) after "... atoms," insert -- R' is halogen, --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents